(12) United States Patent
Kremmer et al.

(10) Patent No.: US 10,921,171 B2
(45) Date of Patent: Feb. 16, 2021

(54) ARRANGEMENT FOR DETECTION OF THE AMOUNT OF MATERIAL IN A SUPPLY CONTAINER OF A MACHINE FOR APPLICATION OF MATERIAL TO A FIELD

(71) Applicant: Deere & Company, Moline, IL (US)

(72) Inventors: Martin Kremmer, Mannheim (DE); Valentin Gresch, Kaiserslautern (DE)

(73) Assignee: Deere & Company, Moline, IL (US)

( * ) Notice: Subject to any disclaimer, the term of this patent is extended or adjusted under 35 U.S.C. 154(b) by 394 days.

(21) Appl. No.: 15/669,791

(22) Filed: Aug. 4, 2017

(65) Prior Publication Data

US 2018/0035603 A1 Feb. 8, 2018

(30) Foreign Application Priority Data

Aug. 5, 2016 (DE) .......................... 102016214553.3

(51) Int. Cl.
*G01F 23/00* (2006.01)
*A01C 15/00* (2006.01)
(Continued)

(52) U.S. Cl.
CPC .......... *G01F 23/0076* (2013.01); *A01C 7/082* (2013.01); *A01C 7/20* (2013.01); *A01C 15/006* (2013.01); *A01C 21/005* (2013.01); *A01C 5/064* (2013.01); *A01C 5/068* (2013.01); *A01C 7/105* (2013.01); *A01C 7/203* (2013.01); *G01F 23/0007* (2013.01); *G01F 23/20* (2013.01)

(58) Field of Classification Search
CPC .. G01F 23/00; G01F 23/0007; G01F 23/0061; G01F 23/0076; G01F 23/20; G01F 23/205; A01C 7/00; A01C 7/102; A01C 7/105; A01C 7/20; A01C 7/203; A01C 15/006; A01C 23/007
USPC .......................................... 73/296, 433, 861
See application file for complete search history.

(56) References Cited

U.S. PATENT DOCUMENTS 5,915,313 A 6/1999 Bender et al.
5,931,882 A * 8/1999 Fick ..................... A01B 79/005
111/903

(Continued)

FOREIGN PATENT DOCUMENTS

DE 2819365 A1 11/1978
DE 8805329 U1 7/1988
(Continued)

*Primary Examiner* — Benjamin R Schmitt
(74) *Attorney, Agent, or Firm* — Hanley, Flight & Zimmerman, LLC

(57) ABSTRACT

An arrangement for detection of the amount of material in a supply container of a machine for application of material to a field comprises a data entry device for receiving fill level data concerning an amount of material present in the supply container at a specific time point and an outflow sensor for detection of the amount of material that has flowed out of the supply container. A computer device connected to the data entry device and outflow sensor, the computing device is programmed to calculate the current amount of material in the supply container using the obtained fill level data and the signals of the outflow sensor obtained after the specific time point, and to issue a warning signal if the amount of material in the supply container goes below a predetermined level.

1 Claim, 2 Drawing Sheets

(51) Int. Cl.
 *A01C 7/08* (2006.01)
 *A01C 7/20* (2006.01)
 *A01C 21/00* (2006.01)
 A01C 7/10 (2006.01)
 A01C 5/06 (2006.01)
 G01F 23/20 (2006.01)

(56) References Cited

U.S. PATENT DOCUMENTS

| | | | | |
|---|---|---|---|---|
| 5,963,139 | A | * | 10/1999 | Littke .................. A01B 79/005 |
| | | | | 111/903 |
| 6,070,539 | A | | 6/2000 | Flamme et al. |
| 9,198,343 | B2 | | 12/2015 | Mariman et al. |
| 2012/0036914 | A1 | * | 2/2012 | Landphair .............. A01C 7/081 |
| | | | | 73/1.16 |
| 2015/0359164 | A1 | * | 12/2015 | Bardi ...................... A01C 1/00 |
| | | | | 47/57.6 |

FOREIGN PATENT DOCUMENTS

| | | |
|---|---|---|
| DE | 102014019755 A1 | 6/2016 |
| EP | 1155606 A2 | 11/2001 |
| EP | 2517545 A1 | 10/2012 |

\* cited by examiner

ARRANGEMENT FOR DETECTION OF THE AMOUNT OF MATERIAL IN A SUPPLY CONTAINER OF A MACHINE FOR APPLICATION OF MATERIAL TO A FIELD

RELATED APPLICATIONS

This document claims priority based on German Patent Application No. 102016214553.3, filed on Aug. 5, 2016, which is hereby incorporated by reference into this application.

FIELD OF THE INVENTION

The invention concerns an arrangement for detection of the amount of material in a supply container of a machine for application of material to a field.

BACKGROUND

Seeding machines are used in agriculture to put seed into the ground. The seed in the case of single-seed seeding machines, is taken seed by seed from a supply container by means of a metering device and deposited in the soil. Usually, multiple seeding units are arranged side by side in order to be able to sow a plurality of rows at the same time. Usually, each seeding unit is associated with its own smaller supply container, or all the seeding units are connected to a larger, jointly used supply container, which little by little sends the seed to a smaller supply vessel that is associated with the individual seeding unit.

It is relatively important to take care that there is still seed in the container, especially when each seeding unit has its own, smaller supply container, since otherwise undesirable gaps would arise in the sown crop stand. Accordingly, the seeding machine operator must take care that he has loaded sufficient seed and must take care to check the state of fill from time to time. For this he must leave his spot on the towing vehicle and inspect all the supply containers of the seeding machine, which is relatively time consuming.

It was proposed in U.S. Pat. No. 6,070,539 to outfit the individual supply containers of a seeding machine with fill level sensors, not described in more detail, which send a warning to a computer device when the seed contained in the supply container falls below a predetermined level. In this case the operator, on an indication from the computer device, can fill the supply container or switch it automatically or by operator determination to a supply container containing a different seed. Moreover, a sensor is provided for detection of a seed rate, which counts the released seeds and, in the case the supply container is empty, issues a warning to the computer device and ultimately to the operator.

In the prior art, weight sensors (German Patent Application No. DE 88 05 329 U1, German Patent Application No. DE 28 19 365 A1, European Patent Application No. EP 1 155 606 A2) or other sensors that interact with the seed mechanically, electrically, or acoustically (German Patent Application No. DE 88 05 329 U1) were proposed as fill level sensors.

U.S. Pat. No. 9,198,343, which is viewed as defining the category, describes a seeding machine that is made up of a plurality of sections, specifically a central section with a larger seed tank, the contents of which are little by little delivered to the individual seeding units, and lateral wing sections. Support forces provided by hydraulic cylinders, which press the wing sections downward, are automatically adjusted on the basis of the weight of the seed tank, whose contents are determined by means of a one-time determination of its fill level and the applied amounts of seed, which are counted by sensors on the seeding unit. Detection of the fill level is done by an operator by means of an entry into a control.

A disadvantage is seen with the seed rate detecting sensor of U.S. Pat. No. 6,070,539 in that it does not issue a signal until a gap in the sown crop stand has already occurred. The other sensors that were mentioned for detection of the fill level are relatively costly. In the case of U.S. Pat. No. 9,198,343, the measured content of the seed tank serves only to control the support forces.

SUMMARY

An arrangement for detection of the amount of material in a supply container of a machine for application of material to a field comprises a data entry device for receiving fill level data concerning an amount of material present in the supply container at a specific time point and an outflow sensor for detection of the amount of material that has flowed out of the supply container. A computer device connected to the data entry device and outflow sensor, the computing device is programmed to calculate the current amount of material in the supply container using the obtained fill level data and the signals from the outflow sensor obtained after the specific time point. The computer device is programmed to send a warning signal if the amount of material in the supply container goes below a predetermined amount, in order to notify the operator to refill the supply container.

A method for detecting the amount of material in a supply container of a machine for application of material to a field is provided. The method includes identifying, with a computer device, at least one of a volume density or mass density of the material in the supply container. The method further includes identifying, with a computer device, fill level data for an amount of material present in the supply container at a specific time point. The method also includes receiving, with the computer device, data from an outflow sensor, the data relating to the amount of material that has flowed out of the supply container and calculating, with the computer device, the amount of material in the supply container. In another example, the method includes calculating, with the computer device, a path length or area which can be covered by each supply container using the amount of material in the supply containers and identifying, with the computing device, a shortest path length which can be covered by each supply container using the amount of material in the supply containers. The method further includes displaying to an operator the supply container with the shortest remaining path length.

BRIEF DESCRIPTION OF THE DRAWINGS

An embodiment example of the invention, which is described in more detail below, is presented in the drawings. Here.

DETAILED DESCRIPTION

Figure 1:
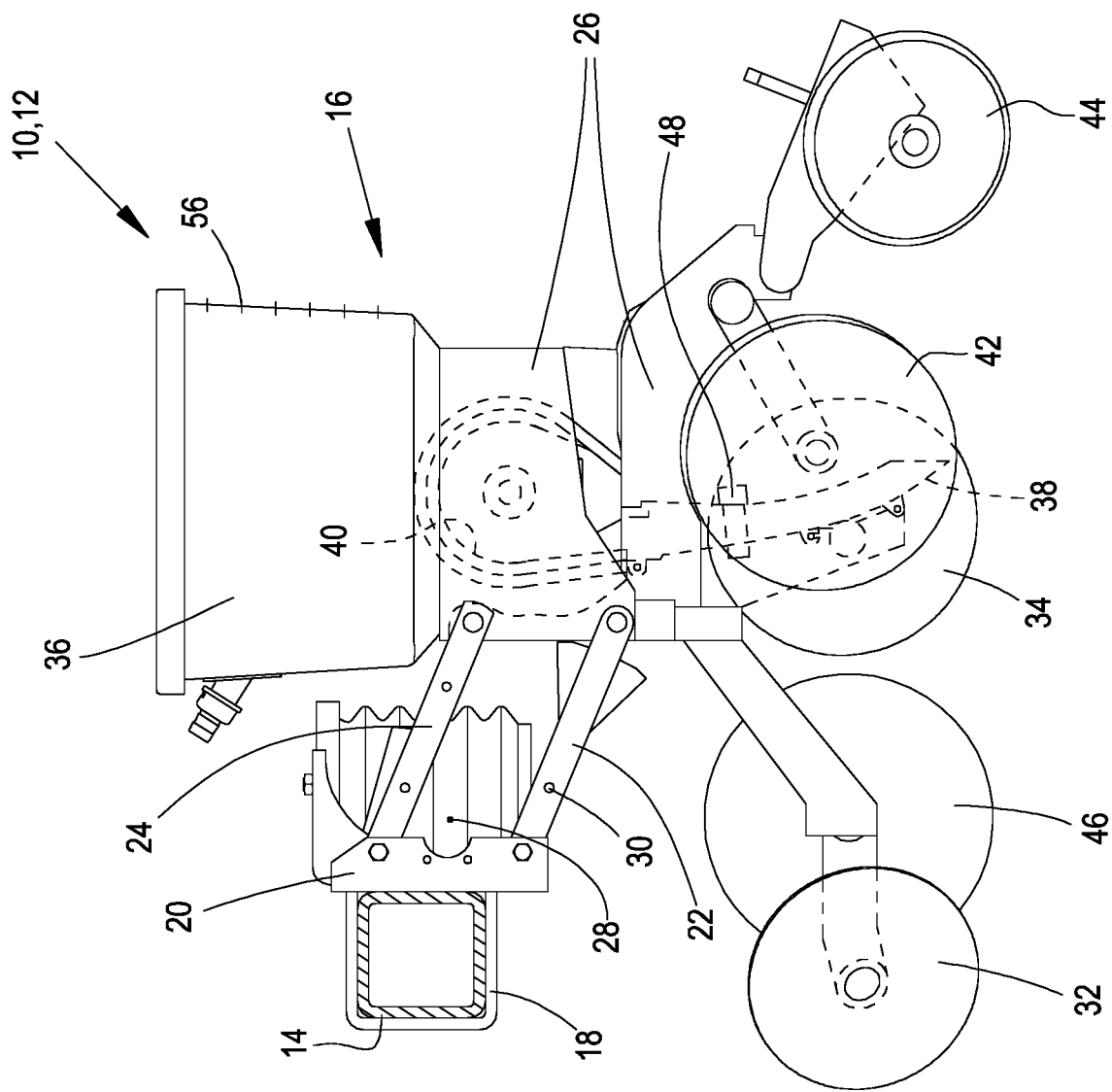
FIG. 1 shows a side view of a machine for application of material to a field with an arrangement for detection of the amount of material in its supply container.
Figure 1:
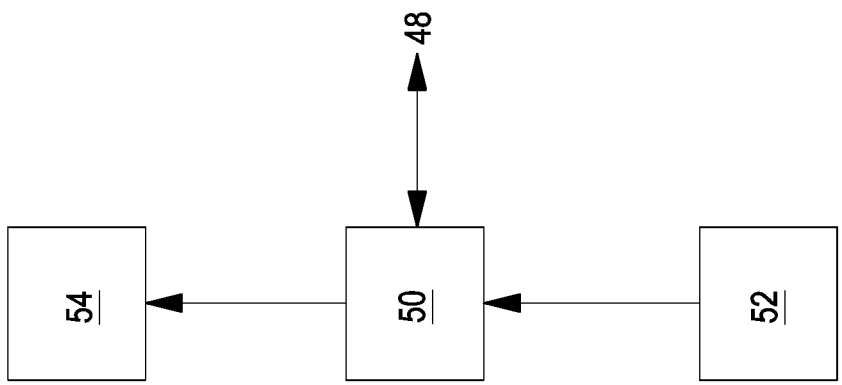

The amount of material in the supply container is not measured directly, but rather the amount of material in the supply container is detected or at least estimated at a specific time point. In addition, after the said specific time point, the amount of material that has been taken from the supply container—and applied to the field—is detected by means of a sensor. Such sensors are standard with today's machines for application of material so as to be able to monitor and/or control their operation. The amount of removed material is integrated and subtracted from the amount determined at the specific time point, thus calculating the current amount of material in the supply container. In this way there is no need for a separate sensor for detection of the fill level in the supply container, and the operator can be given a timely warning to refill the supply container.

"Amount" here can, for example, mean the total volume or volume per unit of material in the supply container, the total weight or weight per unit of material in the supply container, the number of units (e.g., seeds) of the material in the supply container, or the fill level of a material in the supply container. "Warning" can be any signal to the operator, such as acoustic information (bell tone, etc.), visual signal (indication on a display device or a display of the amount of material).

The means for detection of data can be a device for manual entry of information concerning an amount of material present in the supply container at a specific time point. The operator can, accordingly, estimate what the fill level is by means of a supply container scale and enter this amount into the entry device. If he is filling an empty or nearly empty supply container, he can enter the volume or the weight of the loaded material. In this case he can alternatively enter or read data concerning the package in which all of the material filled into the supply container was contained (for example, reading a barcode or another identifier on the package by means of a camera) and by means of said data the computer device determines the amount of material in the supply container. In another embodiment the said information concerning an amount of material in the supply container present at a specific time point can be created by means of a separate fill level sensor, which detects when the amount of material in the supply container goes below a predetermined fill level, for example corresponding to a supply container which is still 10% full. This fill level sensor can be incorporated relatively simply and cheaply, for example as a light beam, which only needs to detect that the material has gone below a fill level.

In particular, the material can consist of seeds and the sensor can be designed to count the seeds taken from the supply container. Such a material is usually applied by a single-seed seeding machine with a separation device for the material. On the other hand, if the machine does not apply the material seed by seed, as in the case of a seed drill, it would also be conceivable to detect other data concerning the applied material by the sensor, such as its volume or weight.

If the material applied seed by seed is counted, it is meaningful to supply the computer device with data concerning a ratio between the number of seeds of the material and its volume or weight and to take this ratio into account in computing the amount of material in the supply container. If the fill level in the supply container is known, for example from an entry by the operator, the volume of the material present can be calculated from its shape and, if the mass density is known, possibly the weight of the material that is present can be calculated. The volume or weight flowing out can be calculated by means of the said data and thus ultimately the volume of the material or its weight remaining in the supply container can be calculated.

The data concerning the ratio between the number of seeds of the material and its volume or weight can be entered into the computer device via a data entry device by an operator or it can be read by means of an item of information identifying the material from a local or remote memory, where the information identifying the material can be entered by the operator or can be read by means of an identification feature on a package of the material.

The computer device can be programmed to calculate the path length or area that can still be planted or provided with the material, based on the calculated amount of material in the supply container, and to display this information. The computer device can be programmed to calculate the path length or area that can still be planted with the material present in the supply container, by means of a planting chart in which a map of the field with the intended path of the machine and the intended planting positions or spacing of material has been entered, and to display this information. Here, when there is a plurality of machine units each associated with its own supply container, it is possible to calculate and display the unit that has the shortest remaining path length.

The computer device can be made as an onboard computer of a tractor or self-propelled machine pulling the machine or otherwise moving it over the field or can be designed as a separate device, for example as a mobile telephone or tablet or laptop computer.

FIG. 1 shows, as an example of a machine 10 for application of material to a field, a single-seed seeding machine 12. The seeding machine 12 comprises a transverse frame 14, which is attached in any desired way to a tractor (not shown) or a separate chassis pulled by a tractor, which pulls the seeding machine 12 over a field and carries it. The transverse frame 14 extends over the entire width of the seeding machine 12 and multiple seeding units 16 are attached to it side by side. The seeding units 16 are attached to the transverse frame 14 via U-shaped brackets 18, which are connected to a console 20, which extends vertically on the rear side of the transverse frame 14 and to which two link arms 22, 24 are hinged, one above the other, the link arms additionally each being hinged to a frame 26 of the seeding unit 16. The link arms 22, 24 form an adjustable parallelogram with the console 20 and the frame 26, which defines the height of the frame 26 above the soil. A pneumatic actuator 28 which serves as preloading means engages the top to the console 20 on the one side and the bottom to the lower link arm 22 (at point 30) on the other side and defines the position of the frame 26 and the pressing force with which the furrow openers 34, 36, which are supported on frame 26, interact with the soil.

Frame 26 carries, in a substantially known way, a supply container 36, a seed tube 38, and a metering device 40 (in particular, a pneumatic device, operating at reduced pressure provided by a blower, not shown), which gradually dispenses individual seeds from the supply container 36 into the seed tube 40, which deposits the seed in a furrow, which was produced by the furrow opener 34, the depth of operation of which is set by a gauge wheel 42. The furrow is closed by a closing wheel 44. An additional furrow can be produced by the furrow opener 46, the working depth of which is specified by a gauge wheel 32. This additional furrow can serve to hold fertilizers via an additional plowshare, not shown, and can be likewise closed by the closing wheel 44. As for additional details of the seeding unit 16, one is referred to the disclosure of European Patent Application No. EP 2 517 545 A1, the disclosure of which is hereby incorporated by reference.

A computer device 50 is provided to determine the amount of material contained in the supply container 36, which here concerns seed grain, the computer device being connected to an operator entry device 52, a display device 54, and a sensor 48 for detection of the amount of seeds, which records the number of seeds deposited by the metering device 40 from the supply container 36 into the seed tube 38 and thus into the soil, for example optically. Such sensors have long been known in the prior art and serve to control the drive of the metering device 40. The sensor 48 can be wirelessly linked to the computer device 50, for example by electromagnetic waves, or connected to it by cable, for example via a bus. The operator entry device 52 can be designed as a keyboard or touch sensitive display device 54. The operator entry device 52, the computer device 50, and the display device 54 can be designed as an onboard computer of a tractor, which pulls or carries the seeding machine 12, or as a separate, in particular portable device in the form of a smart phone or tablet or laptop computer.

Figure 2:
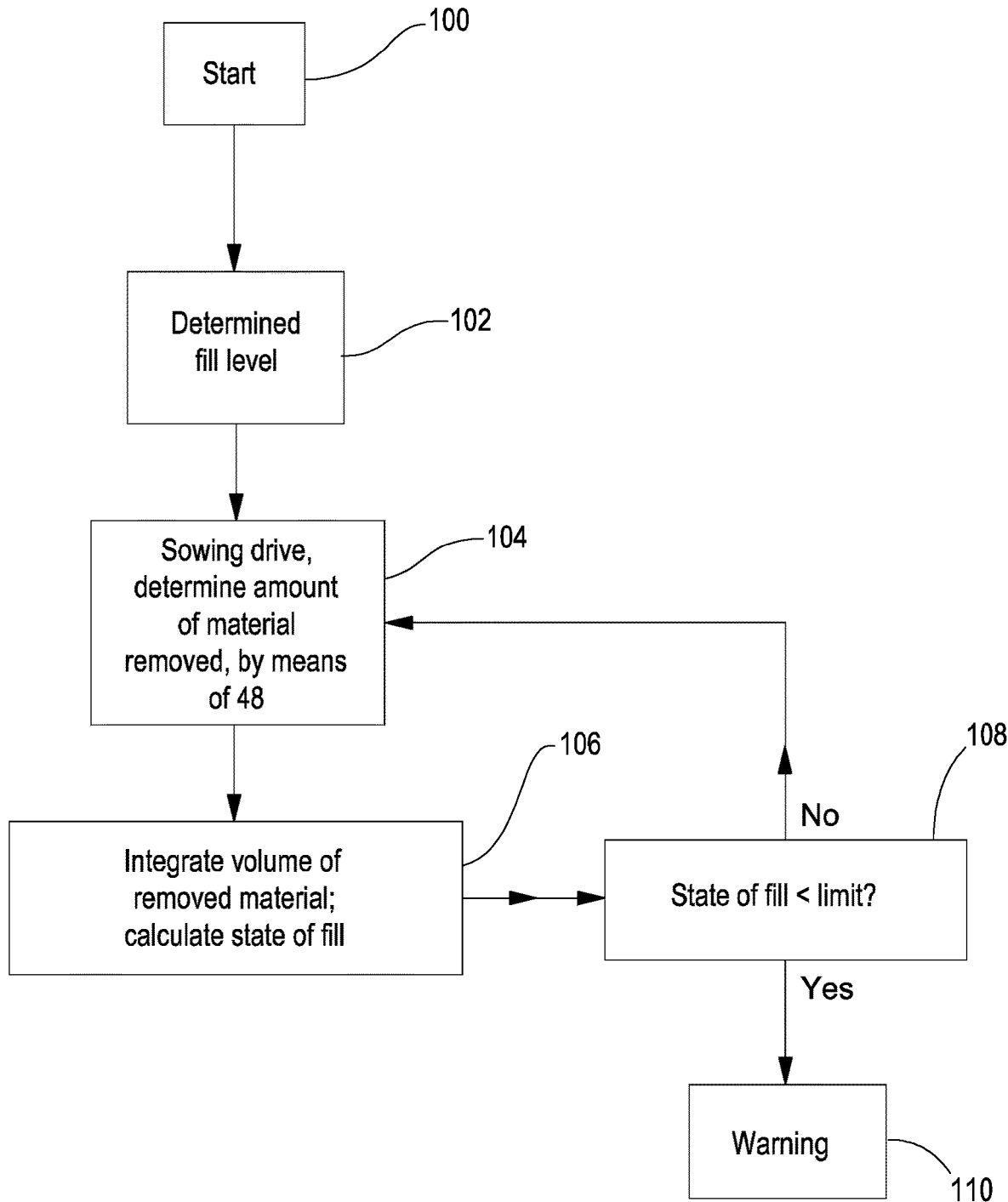
FIG. 2 shows a flowchart by which the computer device of the arrangement operates.

The operation of the computer device 50 is shown in FIG. 2. After the start in step 100, the fill level of the supply container 36 is detected in step 102. For this the operator begins at the supply container 36 and reads its fill level on a scale 56 and enters said fill level in the operator entry device 52, preferably after he has filled the supply container 36 with material in the form of seed for a sowing operation.

In the next step 104, the sowing drive is now acquired, i.e., the machine 10 is moved over a field and by means of the seed metering device 40, material is gradually removed from the supply container 36. How much seed has been little by little deposited in the soil is detected by the sensor 48.

In step 106 the volume of the removed material is integrated. For this, data concerning the ratio between the number of seeds of the material and its volume (i.e., the volume density) are present at the computer device 50. This data can, for example, say how many seeds make up a liter of volume. This data can have been entered by the operator in step 100 or have been read by means of an item of information identifying the material from a local memory of the computer device 50 or via a data transmission device (for example a mobile phone connection via an internet protocol) from a remote memory (external server, etc.), for which the information identifying the material can be derived by the operator (for example in the form of a designation for the material, such as seed XYZ with batch number n from the firm QRST) or by means of an identification feature (for example barcode or QR code) of a package (sack, etc.) of the material and entered. The computer device 50 integrates or sums the number of withdrawn seeds and divides it by the measured density (in number per volume) of the material and determines the withdrawn volume. The current fill level that is now present is calculated in step 106 by means of the original fill level (step 102) and the withdrawn volume.

Step 108 asks if the current fill level is less than a predetermined limit value, which is permanently defined or can be set by the operator. If this not the case, step 104 is repeated; otherwise step 110 is carried out, in which a warning is sent to the operator via the display device 54. After filling the supply container 36, the process of FIG. 2 can then be continued again with step 100.

The computer device 50 can be programmed to show the current fill level during steps 104 to 108 on the display device 54. Also, it can be indicated what path length or area can still be covered with the material present in supply container 36. For this the computer device 50 can be sent data concerning the spacing of successive seed depositing positions, which can take place in particular by a control of the metering device 40 or by means of a planting chart present in the computer device 50, in which a map of the field with the desired path of the seeding machine 12 and the intended seed depositing positions or depositing spacing has been entered. It is thus taken into account what exact path a seeding unit 16 is intended to cover and what the spacing of the depositing positions are. A seeding unit 16 on an outside curve will release more material (seed) than a seeding unit 16 on an inside curve if the spacing of the seed depositing positions is the same If the seeding machine 12 comprises a plurality of seeding units 16, each of which is associated with a supply container 36, the steps 100 through 110 and the calculation of the remaining path are carried out for all seeding units 16 separately. In this case it is taken into account which of the plurality of seeding units 16 of the seeding machine 12 has the shortest remaining path and exactly this is shown on the display.

If the seeding machine 12 comprises a plurality of supply containers 36, which are associated with a metering device 40 and which can be switched between automatically or manually (see U.S. Pat. No. 5,915,313) in order to be able to apply different seed varieties, for example, at places with different soil types or topology, it is possible to determine by means of the planting chart what amount of which seed is required for the planned path, i.e., the coverage is determined by means of the target populations in the planting chart. If the sowing sequence is not known, the current target population is used as the basis for the achievable coverage.

The operator thus will know how far he can still work without refilling the supply container 36 and can possibly utilize potential work interruptions for filling the supply container 36, if this seems appropriate.

If the machine 10 is intended to have an additional supply container for fertilizer, its fill level can also be determined with the described procedure.

Finally, it should be also be noted that one could, alternatively or additionally, still incorporate a fill level sensor into the supply container 36 and connect it to the computer device 50. Such a fill level sensor could be disposed between a larger seed container and a smaller, subordinate container, as described in German Patent Application No. DE 10 2014 019 755 A1, the disclosure of which is hereby incorporated by reference. With this sensor, designed as a light beam, for example, one can detect when the larger seed container is empty and only a small amount of seed is still available. Moreover, a fill level warning can be realized in a manner similar to FIG. 2, analogous to a low fuel warning in an automobile. In addition, the said fill level sensor (or any other fill level sensor in supply container 36) can serve to detect that a certain fill level in supply container 36 has been reached and its signal can appear instead of the operator entry of step 102.

Having described one or more embodiments, it will become apparent that various modifications can be made without departing from the scope of the invention as defined in the accompanying claims. Further embodiments of the invention may include any combination of features from one or more dependent claims, and such features may be incorporated, collectively or separately, into any independent claim.

The invention claimed is:

1. An apparatus for detection of coverage of a machine based on material in each of first and second supply containers of the machine, the apparatus comprising:

a data entry device for receiving fill level data concerning an amount of material present in each of the first and second supply containers at a specific time point;

outflow sensors to detect an amount of material that has flowed out of each of the first and second supply containers; and a computer device receiving information from the data entry device and the outflow sensors, the computing device programmed to:

calculate a current amount of material in each of the first and second supply containers using the fill level data and information from the outflow sensors obtained after the specific time point;

calculate a path length or area which can be covered by each of the first and second supply containers based on an amount of material in the first and second supply containers;

identify a shortest path length that can be covered by the first and second supply containers based on the amount of material in the first and second supply containers; and display an indication of the supply container with a shortest path length.

* * * * *